United States Patent
Lecue et al.

(12)

(10) Patent No.: US 11,036,718 B2
(45) Date of Patent: Jun. 15, 2021

(54) LINKING ENTITIES IN DYNAMIC GRAPHS

(71) Applicant: Accenture Global Solutions Limited, Dublin (IE)

(72) Inventors: Freddy Lecue, Dublin (IE); Md Faisal Zaman, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 194 days.

(21) Appl. No.: 16/117,128

(22) Filed: Aug. 30, 2018

(65) Prior Publication Data
US 2020/0073976 A1    Mar. 5, 2020

(51) Int. Cl.
*G06F 16/23* (2019.01)
*G06F 16/245* (2019.01)
*G06F 16/901* (2019.01)

(52) U.S. Cl.
CPC ........ *G06F 16/2365* (2019.01); *G06F 16/245* (2019.01); *G06F 16/9024* (2019.01)

(58) Field of Classification Search
USPC .......................................... 707/690
See application file for complete search history.

(56) References Cited

U.S. PATENT DOCUMENTS

| | | | |
|---|---|---|---|
| 2013/0096946 A1* | 4/2013 | Shah | G16H 10/60 705/3 |
| 2013/0325787 A1 | 12/2013 | Gerken et al. | |
| 2014/0280114 A1* | 9/2014 | Keysar | G06F 16/9535 707/730 |
| 2014/0280952 A1 | 9/2014 | Shear et al. | |
| 2014/0278786 A1 | 11/2014 | Liu-Qiu-Yan | |
| 2014/0337306 A1* | 11/2014 | Gramatica | G06F 16/2471 707/706 |
| 2015/0095303 A1* | 4/2015 | Sonmez | G06N 5/003 707/707 |
| 2015/0127632 A1* | 5/2015 | Khaitan | G06F 16/9535 707/722 |
| 2015/0178273 A1* | 6/2015 | Hakkani-Tur | G06F 40/40 704/9 |
| 2017/0221240 A1* | 8/2017 | Stetson | G06F 16/9024 |
| 2018/0068031 A1* | 3/2018 | Hewavitharana | G06F 40/295 |
| 2018/0103052 A1 | 4/2018 | Choudhury et al. | |
| 2018/0121546 A1* | 5/2018 | Dingwall | G06F 16/951 |
| 2018/0314729 A9 | 11/2018 | Reschke et al. | |

* cited by examiner

*Primary Examiner* — Hosain T Alam
*Assistant Examiner* — Nicholas E Allen
(74) *Attorney, Agent, or Firm* — Fish & Richardson P.C.

(57) ABSTRACT

Implementations of the present disclosure are generally directed to linking entities in dynamic knowledge graphs, and more particularly, to linking entities in knowledge graphs based on contextual evolution in one or more dimensions.

36 Claims, 7 Drawing Sheets

LINKING ENTITIES IN DYNAMIC GRAPHS

BACKGROUND

Knowledge graphs can be described as information bases that record real-world relationships between entities. More particularly, a knowledge graph is a collection of data that is related based on a schema representing entities and relationships between entities. The data can be logically described as a graph (even though also provided in table form), in which each distinct entity is represented by a respective node, and each relationship between a pair of entities is represented by an edge between the nodes. However, particulars about entities, and/or relationships between entities can change over one or more dimensions. Consequently, a knowledge graph can be dynamic.

SUMMARY

Implementations of the present disclosure are generally directed to linking entities in dynamic knowledge graphs. More particularly, implementations of the present disclosure are directed to linking entities in knowledge graphs based on contextual evolution in one or more dimensions.

In some implementations, actions include receiving an initial knowledge graph, receiving a database of changes, each change corresponding to a dimension of one or more dimensions, generating a set of linked knowledge graphs for a particular domain, the set of linked knowledge graphs representing an evolution from the initial knowledge graph in the one or more dimensions, generating the set of linked knowledge graphs, with each knowledge graph based on one or more changes provided in the database of changes, and the initial knowledge graph, by: providing a link between a node of a first knowledge graph of the set, and a node of a corresponding second knowledge graph of the set, a value of the node of the first knowledge graph being different from a value of the node of the second knowledge graph, and receiving query data from a data source, generating a query knowledge graph based on the query data, and a knowledge graph in the set of linked knowledge graphs, the query knowledge graph including a change with respect to the knowledge graph in the set of linked knowledge graphs, and determining that the query data is inconsistent with the query knowledge graph, and in response, issuing an alert. Other implementations of this aspect include corresponding systems, apparatus, and computer programs, configured to perform the actions of the methods, encoded on computer storage devices.

These and other implementations can each optionally include one or more of the following features: the query knowledge graph is generated based on the query data, and the final knowledge graph in the set of linked knowledge graphs; determining that the context data is inconsistent with the reconfigured knowledge graph at least partially includes determining that the link is invalid; the context data changes in at least one dimension of the one or more dimensions; the one or more dimensions includes time, geography, and regulations; generating a disambiguated domain ontology based on a domain ontology of the particular domain, and context data received from a data source includes linking a term of the domain ontology with a respective value of the context data; generating a contextualized knowledge graph based on the disambiguated domain ontology, and a knowledge graph in the set of linked knowledge graphs includes associating a term of the disambiguated domain ontology with a node of the knowledge graph, and the change comprising an added node to the contextualized knowledge graph from the knowledge graph; at least a portion of the context data is received from one or more sensors; the query knowledge graph is generated by inserting one or more nodes based on the query data into the knowledge graph in the set of linked knowledge graphs; actions further include linking the one or more inserted nodes to one or more nodes in the knowledge graph in the set of linked knowledge graphs; actions further include determining the node in the knowledge graph in the set of linked knowledge graphs to which the inserted node is to be linked based on context data received from a data source; and the query data varies over the dimension.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to linking entities in dynamic knowledge graphs. More particularly, implementations of the present disclosure are directed to linking entities in knowledge graphs based on contextual evolution in one or more dimensions. In some implementations, actions include receiving an initial knowledge graph, receiving a database of changes, each change corresponding to a dimension of one or more dimensions, generating a set of linked knowledge graphs for a particular domain, the set of linked knowledge graphs representing an evolution from the initial knowledge graph in the one or more dimensions, generating the set of linked knowledge graphs, with each knowledge graph based on one or more changes provided in the database of changes, and the initial knowledge graph, by: providing a link between a node of a first knowledge graph of the set, and a node of a corresponding second knowledge graph of the set, a value of the node of the first knowledge graph being different from a value of the node of the second knowledge graph, and receiving query data from a data source, generating a query knowledge graph based on the query data, and a knowledge graph in the set of linked knowledge graphs, the query knowledge graph including a change with respect to the knowledge graph in the set of linked knowledge graphs, and determining that the query data is inconsistent with the query knowledge graph, and in response, issuing an alert.

Figure 1:
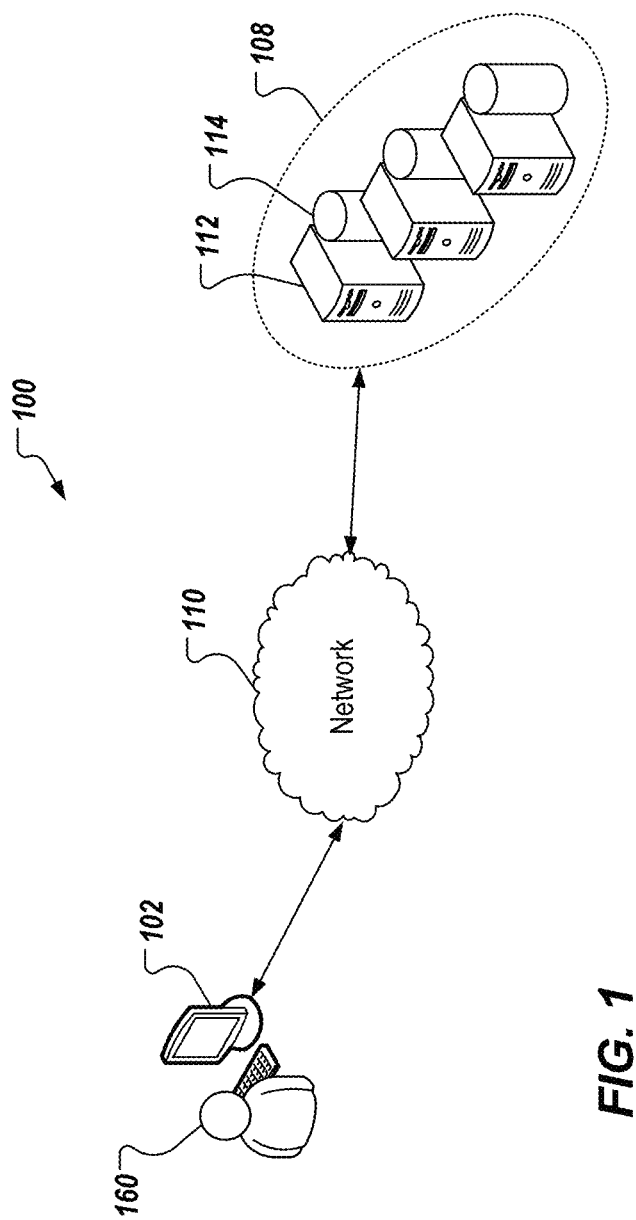
FIG. 1 depicts an example system that can execute implementations of the present disclosure.

FIG. 1 depicts an example system 100 that can execute implementations of the present disclosure. The example system 100 includes a computing device 102, a back-end system 108, and a network 110. In some examples, the network 110 includes a local area network (LAN), wide area network (WAN), the Internet, or a combination thereof, and connects web sites, devices (e.g., the computing device 102), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented service for a knowledge graph platform for linking entities in dynamic knowledge graphs in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the back-end system 108 hosts a knowledge graph platform for linking entities in dynamic knowledge graphs in accordance with implementations of the present disclosure. More particularly, and as described in further detail herein, the knowledge graph platform links entities in knowledge graphs based on contextual evolution in one or more dimensions. In some examples, linking of entities is based on a domain ontology, and input data corresponding to a context.

In some examples, a knowledge graph is a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birth place, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph, for example, [one person identifier, child of, another person identifier], where the other person identifier is a node in the graph.

Figure 2:
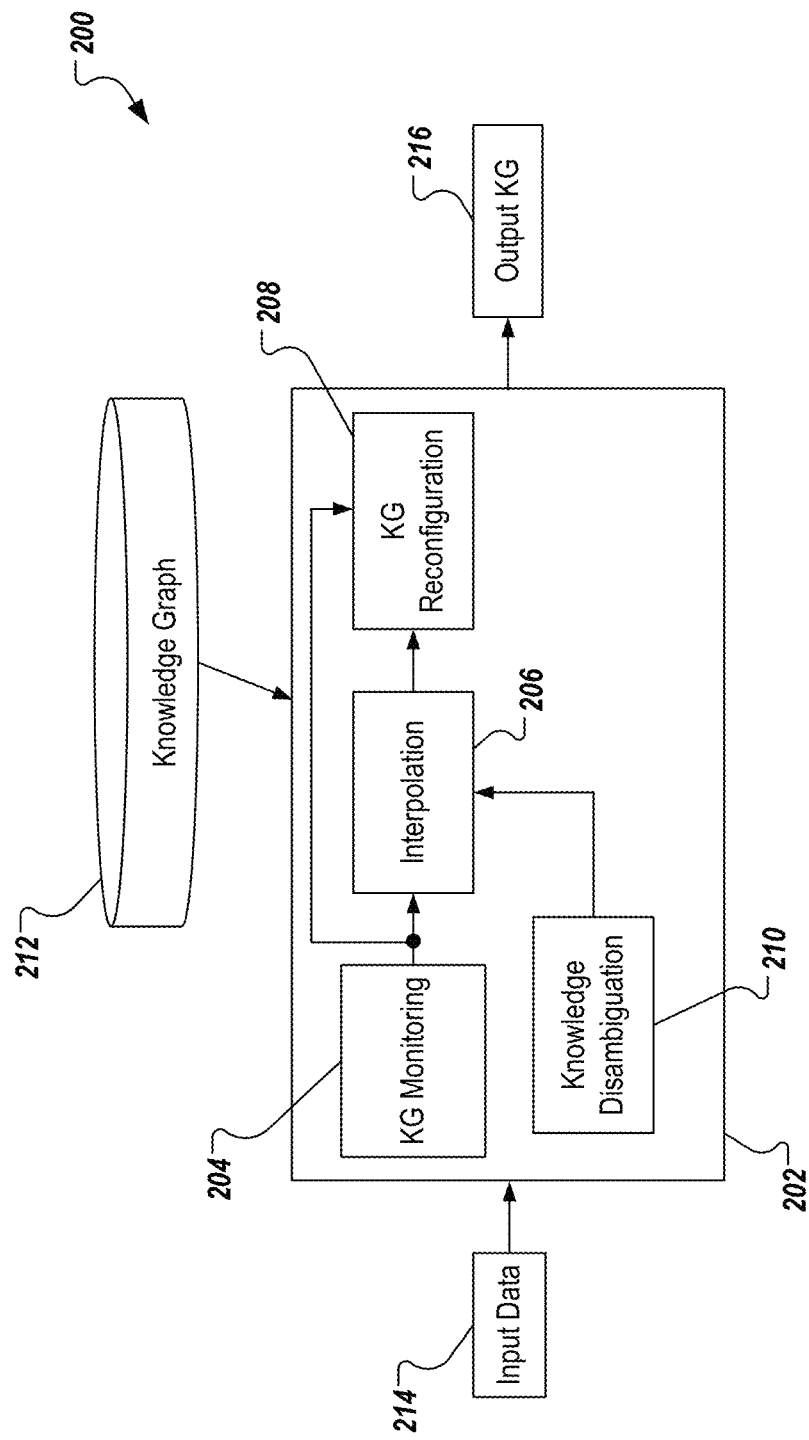
FIG. 2 depicts an example module architecture in accordance with implementations of the present disclosure.

FIG. 2 depicts an example module architecture 200 in accordance with implementations of the present disclosure. The example module architecture 200 includes a knowledge graph (KG) processing system 202 that includes a KG monitoring module 204, an interpolation module 206, a KG reconfiguration module 208, and a knowledge disambiguation module 210. In some examples, and as described in further detail herein, the KG processing system 202 processes dimensionally-evolving knowledge graphs provided in a KG store 212. In some examples, each knowledge graph is a specialized knowledge graph, being specific to a particular domain. In further detail, input data 214 can be input to the KG processing system 202. In some examples, the input data 214 includes, without limitation, dimensionally-evolving contextual data, and a domain ontology. As described in further detail herein, the KG processing system 202 processes the input data 214, and the dimensionally-evolving knowledge graphs to provide an output KG 216. In some examples, the output KG 216 can be described as a reconfigured knowledge graph.

In some implementations, the KG monitoring module 204 receives dimensionally-evolving knowledge graphs from the KG store 212. As described in further detail herein, the dimensionally-evolving knowledge graphs evolve along one or more dimensions. Example dimensions include, without limitation, time, geography, and regulations. In some examples, implementations of the present disclosure can include any appropriate, dimensions that are dynamic. In some examples, the KG monitoring module 204 provides a set of linked knowledge graphs, each knowledge graph representing an instance along a dimension. In some examples, one or more nodes are linked across knowledge graphs in the set of linked knowledge graphs.

In some implementations, the knowledge disambiguation module 210 processes the dimensionally-evolving contextual data, and the domain ontology to link at least a portion of the dimensionally-evolving contextual data to one or more terms in the domain ontology. That is, the knowledge disambiguation module 210 provides a disambiguated domain ontology. In some implementations, the interpolation module 206 receives the set of linked knowledge graphs from the KG monitoring module 204, and the disambiguated domain ontology from the knowledge disambiguation module 210. In some examples, and as described in further detail herein, the interpolation module 206 processes the set of linked knowledge graphs, and the disambiguated domain ontology to provide a contextualized knowledge graph. In some examples, the contextualized knowledge graph includes one or more updates, or changes to the disambiguated domain ontology based on the set of linked knowledge graphs. In some implementations, the KG reconfiguration module 208 receives the set of linked knowledge graphs from the KG monitoring module 204, and the contextualized knowledge graph from the interpolation module 206. In some examples, the KG reconfiguration module 208 processes the set of linked knowledge graphs, and the contextualized knowledge graph to provide the reconfigured knowledge graph as the output KG 216.

Implementations of the present disclosure are described in further detail herein with reference to a non-limiting, example context. The example context includes pharmaceuticals, potential patient ingestion of pharmaceuticals, and time as a dimension (e.g., temporal changes). It is contemplated, however, that implementations of the present disclosure can be realized in any appropriate context.

In the example context, knowledge of pharmaceuticals can be recorded in one or more knowledge graphs. For example, a specialized knowledge graph can be provided (e.g., stored in the KG store 216) that provides relationships between entities associated with one or more pharmaceuticals. For an example pharmaceutical, an example specialized knowledge graph can associate the pharmaceutical to one or more contraindications, and each contraindication to one or more physiological characteristics. With reference to the example context, implementations of the present disclosure provide a reconfigured knowledge graph that accounts for temporal changes to physiological characteristics, and/or contraindications associated with a pharmaceutical. In the example context, an example domain ontology provides an ontology for physiological characteristics.

For purposes of illustration, implementations of the present disclosure are described with reference to an example pharmaceutical, paracetamol, and example physiological characteristics, heart rate, and glucose level. Implementations of the present disclosure are described with reference to an example domain ontology that includes heart rate as an example physiological characteristic.

As introduced above, the KG monitoring module 204 provides a set of linked knowledge graphs, each knowledge graph representing an instance along a dimension. In the example context, the set of linked knowledge graphs can be provided based on paracetamol. In some examples, each knowledge graph in the set of linked knowledge graphs provides relationships between one or more contraindications, and each contraindication to one or more physiological characteristics.

In some implementations, the set of linked knowledge graphs can be provided based on an initial knowledge graph, and a change database (e.g., a table of changes). For example, an initial knowledge graph can be provided, which records relationships between paracetamol and contraindications. In some examples, the initial knowledge graph can be provided based on initial data associated with paracetamol (e.g., results of initial trials). A change database can be provided, and can record changes in contraindications. For example, additional trials can be conducted for paracetamol, and can provide change information regarding relationships between paracetamol, and contraindications.

Figure 3:
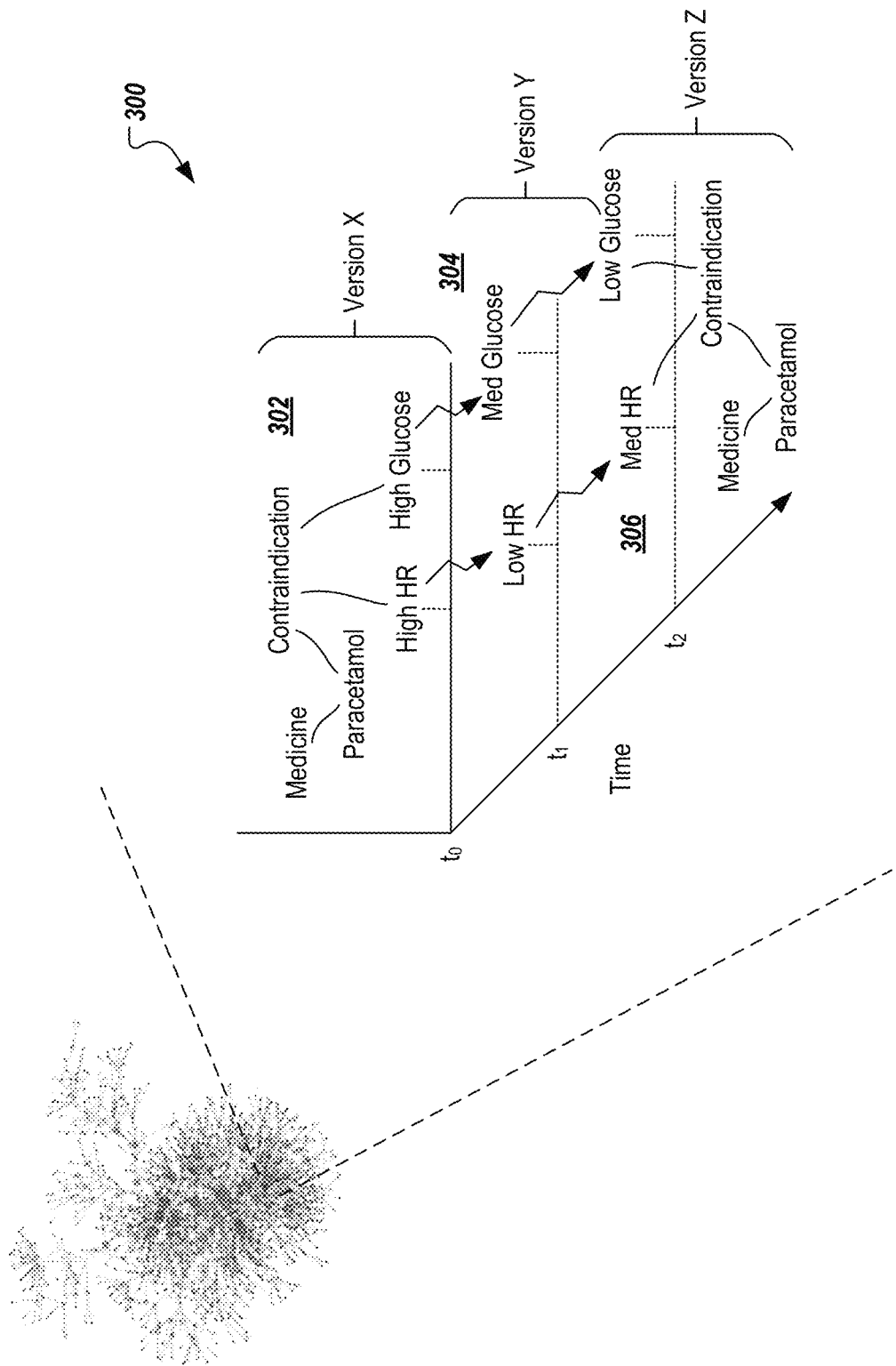
FIG. 3 depicts an example set of linked knowledge graphs based on a knowledge graph that evolves temporally.

FIG. 3 depicts an example set of linked knowledge graphs 300 based on a knowledge graph that evolves temporally. In the example of FIG. 3, respective knowledge graphs 302, 304, 306 are depicted at respective times $t_0$, $t_1$, $t_2$ (e.g., temporal dimension). The knowledge graphs 302, 304, 306 can be referred to as respective versions X, Y, Z. At time to, the knowledge graph 302 relates paracetamol, a medicine, to contraindications of high heart rate (HR), and high glucose. In some examples, the knowledge graph 302 is provided as an initial knowledge graph. In some examples, each version is provided as a representation based on paracetamol as it evolves over time.

At time $t_1$, the knowledge graph 304 relates paracetamol to contraindications of low HR, and medium glucose. At time $t_2$, the knowledge graph 306 relates paracetamol to contraindications of medium HR, and low glucose. Accordingly, the set of knowledge graphs 300 depicts changing relations of paracetamol to contraindications over time. In some implementations, the knowledge graphs 304, 306 are provided based on the change database. That is, for example, the nodes for low HR, and medium glucose in the knowledge graph 304, and the nodes for medium HR, and low glucose in the knowledge graph 306 are provided from changes recorded in the change database.

In accordance with implementations of the present disclosure, nodes are linked between the knowledge graphs 302, 304, 306. That is, the HR nodes are linked, and the glucose nodes are linked. The knowledge graphs are connected based on evolving dimension. In the example context, the evolving dimension includes time. Consequently, the knowledge graphs are ordered based on time (e.g., earliest to latest). One or more nodes that change between times are identified, and linked across the knowledge graphs. In the example of FIG. 3, it is determined that the nodes for HR, and glucose change between times (e.g., $t_0 \rightarrow t_1$, $t_1 \rightarrow t_2$), and are therefore linked across the knowledge graphs 302, 304, 306.

As introduced above, the knowledge disambiguation module 210 provides a disambiguated domain ontology based on a domain ontology, and dimensionally-evolving contextual data. In the example context, the dimensionally-evolving contextual data can include patient data. Example patient data includes physiological characteristics for a first patient and a second patient, and can be provided as:
Patient 1:
Male
Heart Rate 128 bpm
Age 40-45
Glucose Level 0.4
Patient 2:
Female
Heart Rate 94 bpm
Age 20-25
Glucose Level 0.9
In some examples, the physiological characteristics change over a dimension (e.g., provided as time-series data). For example, the HR, and the glucose level for each patient changes over time. Consequently, the example patient data is provided for respective instances of time.

Figure 4:
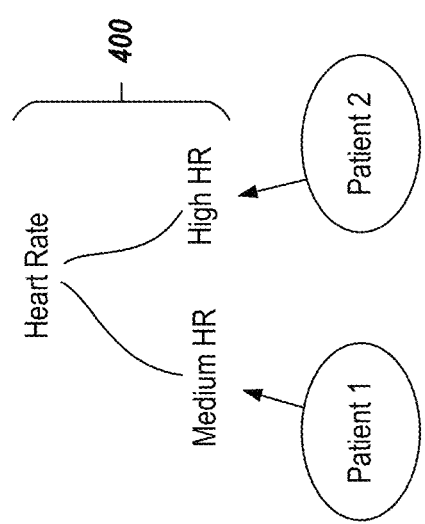
FIG. 4 depicts an example portion of an example domain ontology.

In some implementations, the knowledge disambiguation module 210 relates features of the dimensionally-evolving contextual data to the domain ontology. FIG. 4 depicts an example portion 400 of an example domain ontology. The example portion 400 includes heart rate, and associates high HR, and medium HR to heart rate. In some implementations, the dimensionally-evolving contextual data is associated with the domain ontology for the particular instance of time. For example, a value of the data can be determined, and can be compared to one or more thresholds. In some examples, the thresholds can change depending on other data. For example, for a patient within a first age range, a first threshold can be provided, and for a patient within a second age range, a second threshold can be provided. In the example of FIG. 4, the contextual data for the first patient is associated with a medium HR, and the contextual data for the second patient is associated with a high HR. That is, and in accordance with the example context, because the first patient has a high HR (e.g., 128 bpm, which is greater than a high HR threshold), the contraindication of medium HR is acceptable for the first patient. Because the second patient has a medium HR (e.g., 94 bpm, which is greater than a medium HR threshold, but less than the high HR threshold), the contraindication of high HR is acceptable for the first patient.

As introduced above, the interpolation module 206 processes the set of linked knowledge graphs, and the disambiguated domain ontology to provide a contextualized knowledge graph. More particularly, the interpolation module 206 interpolates the disambiguated domain ontology based on the set of linked knowledge graphs. In some examples, the disambiguated domain ontology is related to a version of the knowledge graphs. For example, the disambiguated domain ontology of FIG. 4 is related to version X (the knowledge graph 302) of the set of linked knowledge graphs 300 of FIG. 3.

In some implementations, the disambiguated domain ontology is related by identifying a node in the knowledge graph that corresponds to a node in the disambiguated domain ontology. Continuing with the examples above, the data for the first patient corresponds to a medium HR. Consequently, the disambiguated domain ontology for the first patient is mapped to the medium HR node of the knowledge graph 306 of FIG. 3. However, the disambiguated domain ontology for the first patient dies not include a node for glucose. Accordingly, a change can be provided to include a low glucose node from the knowledge graph 306 to provide a first contextualized knowledge graph for the first patient. Similarly, the data for the second patient corresponds to a high HR. Consequently, the disambiguated domain ontology for the second patient is mapped to the high HR node of the knowledge graph 302 of FIG. 3. However, the disambiguated domain ontology for the second patient dies not include a node for glucose. Accordingly, a change can be provided to include a high glucose node from the knowledge graph 302 to provide a second contextualized knowledge graph for the second patient.

As introduced above, the KG reconfiguration module 208 processes the set of linked knowledge graphs, and the contextualized knowledge graph(s) to selectively provide a reconfigured knowledge graph as the output KG 216. More particularly, each contextualized knowledge graph (with change(s)) is mapped to the set of linked knowledge graphs to determine whether the contextualized knowledge graph is represented within the temporal evolution of the set of linked knowledge graphs.

Figure 5A:
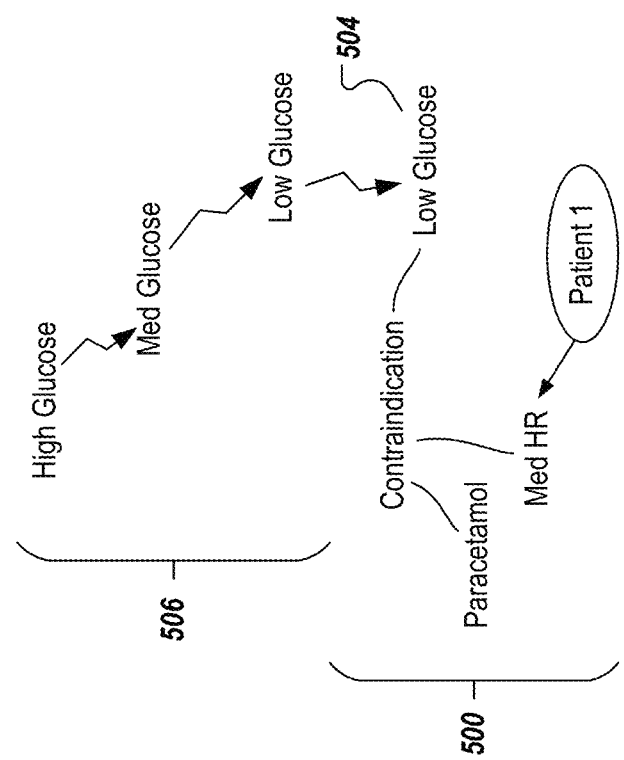
FIGS. 5A and 5B depict example use cases in accordance with implementations of the present disclosure.
Figure 5B:
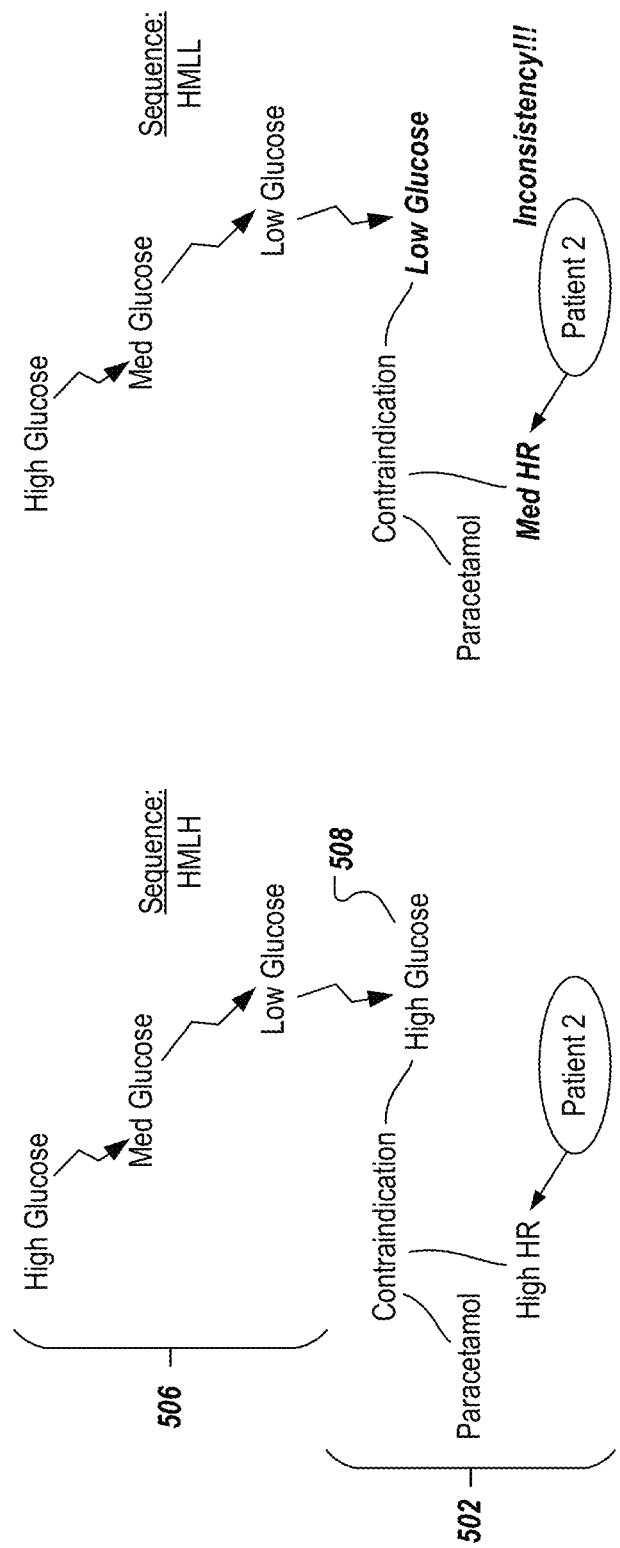

FIGS. 5A and 5B depict example use cases in accordance with implementations of the present disclosure. The example of FIG. 5A corresponds to a first contextualized knowledge graph 500 for the first patient, introduced above by way of example. The example of FIG. 5B corresponds to a second contextualized knowledge graph 502 for the second patient, introduced above by way of example.

With regard to FIG. 5A, a change 504 of the first contextualized knowledge graph 500 is compared to an evolution 506 provided from the set of linked knowledge graphs 300. The evolution 506 corresponds to a temporal evolution. The change 504 corresponds to the addition of a low glucose node to the disambiguated domain ontology for the first patient to provide the first contextualized knowledge graph 500. The first contextualized knowledge graph 500 is compared to the set of linked knowledge graphs 300, and it can be determined that the first contextualized knowledge graph 500 corresponds to the knowledge graph 306 of FIG. 3. That is, the change 504 correspond to the latest glucose node in the evolution 506 (low glucose). Further, it is determined that other nodes in the first contextualized knowledge graph 500 correspond to the knowledge graph 306. For example, the medium HR node of the knowledge graph 306 corresponds to the medium HR node of the first contextualized knowledge graph 500. Consequently, it can be determined that the first contextualized knowledge graph 500 is consistent with the evolution 506, and can be provided as the output (e.g., the output KG 216 of FIG. 2). A result of this example, is that the first patient is able to take paracetamol.

With regard to FIG. 5B, a change 508 of the second contextualized knowledge graph 500 is compared to the evolution 506 provided from the set of linked knowledge graphs 300. The change 508 corresponds to the addition of a high glucose node to the disambiguated domain ontology for the second patient to provide the second contextualized knowledge graph 502. The second contextualized knowledge graph 502 is compared to the set of linked knowledge graphs 300, and it can be determined that the second contextualized knowledge graph 502 corresponds to the knowledge graph 302 of FIG. 3.

However, it is also determined that the change 508 does not correspond to the latest value in the evolution 506. For example, the evolution 506 and change 508 can define a sequence. In the depicted example, the sequence can include HMLH (e.g., high, medium, low, high; the values of the nodes through the evolution 506 to the change 508). This can be determined to be an invalid sequence. For example, the sequence can be determined to be invalid, because the value of the change 508 (high) does not equal the value of the latest node in the evolution 506 (low) (i.e., the knowledge graph 306). In some implementations, the second contextualized knowledge graph 502 can be reconfigured for consistency with the knowledge graph 306. As a result, however, the data for the second patient is inconsistent with the reconfigured knowledge graph. A result of this example, is that the second patient is not able to take paracetamol.

In further detail, the example progression of FIGS. 5A and 5B depict a sequence of changes that are considered for evaluation. In the depicted example, the sequence includes the following changes: High, Medium, Low, Low for Glucose. Given that sequence, implementations of the present disclosure evaluate whether the sequence is represented within the temporal evolution of the knowledge graph. If the sequence is not new, the sequence is considered valid. If the sequence is new (i.e., not trace of sequence High, Medium, Low, Low in the knowledge graph evolution), further processing is performed to get the latest graph that is modified/adapted for validation/consistency purpose. In the instant example, the new sequence breaks the consistency property of the previous graph. Consequently, the edges that make the graph inconsistent are removed. The edges are updated based on what is consistent with the graph. In the depicted example, this would include consistency with Medium HR.

Figure 6:
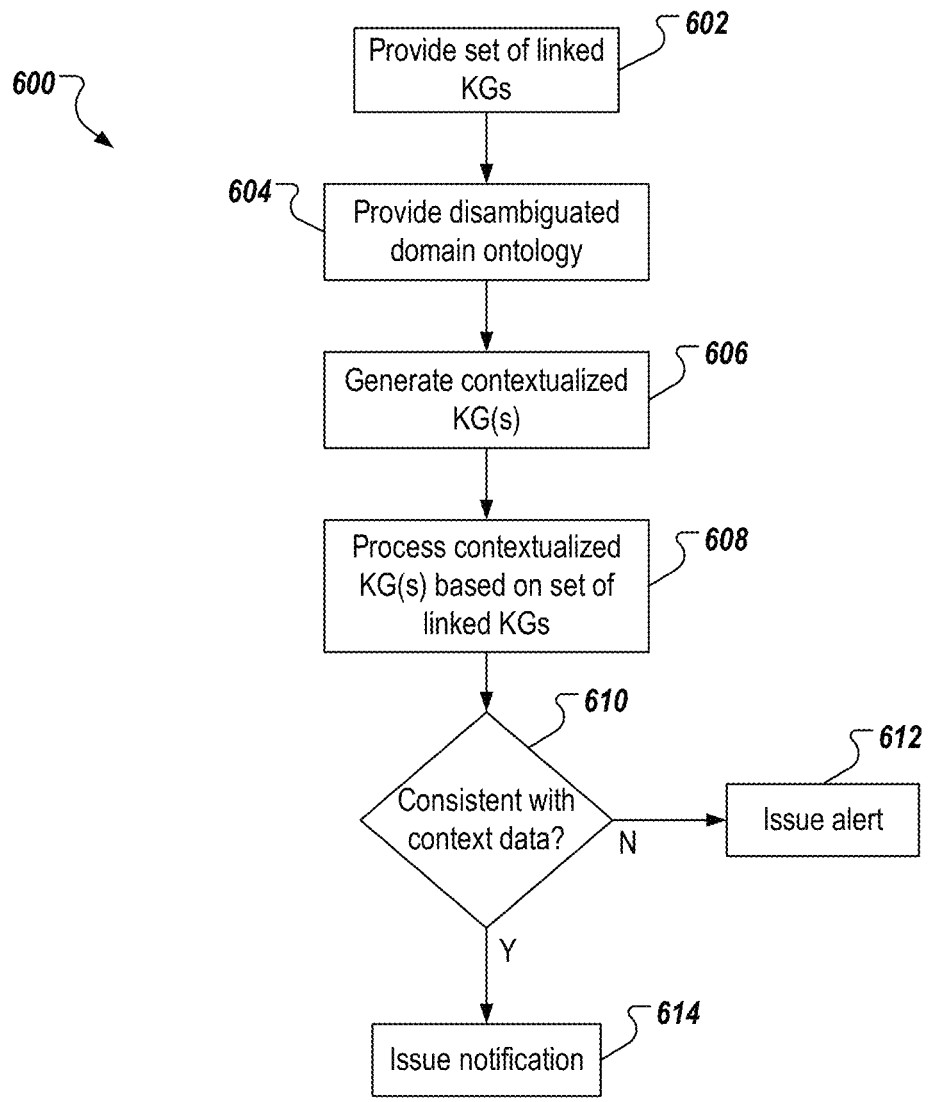
FIG. 6 depicts an example process that can be executed in implementations of the present disclosure.

FIG. 6 depicts an example process 600 that can be executed in implementations of the present disclosure. In some examples, the example process 600 is provided using one or more computer-executable programs executed by one or more computing devices (e.g., the back-end system 108 of FIG. 1).

A set of linked knowledge graphs is provided (602). One or more disambiguated ontologies are provided (604). One or more contextualized knowledge graphs are generated (606). Each contextualized knowledge graph is processed based on the set of linked KGs (608). For each reconfigured KG is determined whether there is consistency with underlying context data (610). If the underlying context data is inconsistent, an alert is issued (612). If the underlying context data is consistent, a notification is issued (614).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors, the method comprising:
   receiving an initial knowledge graph;
   receiving a database of changes, each change corresponding to a dimension of one or more dimensions;
   generating a set of linked knowledge graphs for a particular domain, the set of linked knowledge graphs representing an evolution from the initial knowledge graph in the one or more dimensions, each knowledge graph in the set of linked knowledge graphs being based on one or more changes provided in the database of changes and the initial knowledge graph, the set of linked knowledge graphs being generated by:
      providing a link between a node of the initial knowledge graph and a node of a first knowledge graph of the set, and providing a link between the node of the first knowledge graph and a node of a corresponding second knowledge graph of the set, a value of the node of the first knowledge graph being different from a value of the node of the second knowledge graph, the first knowledge graph and the second knowledge graph representing respective versions of the initial knowledge graph, and links being absent between nodes of the initial knowledge graph and the first knowledge graph and nodes of the first knowledge graph and the second knowledge graph having values that are consistent between versions;
   receiving query data from a data source;
   generating a query knowledge graph based on the query data and one of the first knowledge graph and the second knowledge graph in the set of linked knowledge graphs, the query knowledge graph comprising a change with respect to the one of the first knowledge graph and the second knowledge graph in the set of linked knowledge graphs; and
   determining that the query data is inconsistent with the query knowledge graph, and in response, issuing an alert.

2. The method of claim 1, wherein the query knowledge graph is generated based on the query data, and a final knowledge graph in the set of linked knowledge graphs.

3. The method of claim 1, wherein determining that the context data is inconsistent with the reconfigured knowledge graph at least partially comprises determining that the link is invalid.

4. The method of claim 1, wherein the context data changes in at least one dimension of the one or more dimensions.

5. The method of claim 1, wherein the one or more dimensions comprise time, geography, and regulations.

6. The method of claim 1, wherein generating a disambiguated domain ontology based on a domain ontology of the particular domain, and context data received from a data source comprises linking a term of the domain ontology with a respective value of the context data.

7. The method of claim 1, wherein generating a contextualized knowledge graph based on the disambiguated domain ontology, and a knowledge graph in the set of linked knowledge graphs comprises associating a term of the disambiguated domain ontology with a node of the knowledge graph, and the change comprising an added node to the contextualized knowledge graph from the knowledge graph.

8. The method of claim 1, wherein at least a portion of the context data is received from one or more sensors.

9. The method of claim 1, wherein the query knowledge graph is generated by inserting one or more nodes based on the query data into the knowledge graph in the set of linked knowledge graphs.

10. The method of claim 9, further comprising linking the one or more inserted nodes to one or more nodes in the knowledge graph in the set of linked knowledge graphs.

11. The method of claim 10, further comprising determining the node in the knowledge graph in the set of linked knowledge graphs to which the inserted node is to be linked based on context data received from a data source.

12. The method of claim 1, wherein the query data varies over the dimension.

13. A non-transitory computer-readable storage medium coupled to one or more processors and having instructions stored thereon which, when executed by the one or more processors, cause the one or more processors to perform operations comprising:
receiving an initial knowledge graph;
receiving a database of changes, each change corresponding to a dimension of one or more dimensions;
generating a set of linked knowledge graphs for a particular domain, the set of linked knowledge graphs representing an evolution from the initial knowledge graph in the one or more dimensions, each knowledge graph in the set of linked knowledge graphs being based on one or more changes provided in the database of changes and the initial knowledge graph, the set of linked knowledge graphs being generated by:
providing a link between a node of the initial knowledge graph and a node of a first knowledge graph of the set, and providing a link between the node of the first knowledge graph and a node of a corresponding second knowledge graph of the set, a value of the node of the first knowledge graph being different from a value of the node of the second knowledge graph, the first knowledge graph and the second knowledge graph representing respective versions of the initial knowledge graph, and links being absent between nodes of the initial knowledge graph and the first knowledge graph and nodes of the first knowledge graph and the second knowledge graph having values that are consistent between versions;
receiving query data from a data source;
generating a query knowledge graph based on the query data and one of the first knowledge graph and the second knowledge graph in the set of linked knowledge graphs, the query knowledge graph comprising a change with respect to the one of the first knowledge graph and the second knowledge graph in the set of linked knowledge graphs; and
determining that the query data is inconsistent with the query knowledge graph, and in response, issuing an alert.

14. The computer-readable storage medium of claim 13, wherein the query knowledge graph is generated based on the query data, and a final knowledge graph in the set of linked knowledge graphs.

15. The computer-readable storage medium of claim 13, wherein determining that the context data is inconsistent with the reconfigured knowledge graph at least partially comprises determining that the link is invalid.

16. The computer-readable storage medium of claim 13, wherein the context data changes in at least one dimension of the one or more dimensions.

17. The computer-readable storage medium of claim 13, wherein the one or more dimensions comprise time, geography, and regulations.

18. The computer-readable storage medium of claim 13, wherein generating a disambiguated domain ontology based on a domain ontology of the particular domain, and context data received from a data source comprises linking a term of the domain ontology with a respective value of the context data.

19. The computer-readable storage medium of claim 13, wherein generating a contextualized knowledge graph based on the disambiguated domain ontology, and a knowledge graph in the set of linked knowledge graphs comprises associating a term of the disambiguated domain ontology with a node of the knowledge graph, and the change comprising an added node to the contextualized knowledge graph from the knowledge graph.

20. The computer-readable storage medium of claim 13, wherein at least a portion of the context data is received from one or more sensors.

21. The computer-readable storage medium of claim 13, wherein the query knowledge graph is generated by inserting one or more nodes based on the query data into the knowledge graph in the set of linked knowledge graphs.

22. The computer-readable storage medium of claim 21, wherein operations further comprise linking the one or more inserted nodes to one or more nodes in the knowledge graph in the set of linked knowledge graphs.

23. The computer-readable storage medium of claim 22, wherein operations further comprise determining the node in the knowledge graph in the set of linked knowledge graphs to which the inserted node is to be linked based on context data received from a data source.

24. The computer-readable storage medium of claim 13, wherein the query data varies over the dimension.

25. A system, comprising:
one or more processors; and
a computer-readable storage device coupled to the one or more processors and having instructions stored thereon which, when executed by the one or more processors, cause the one or more processors to perform operations comprising:
receiving an initial knowledge graph;
receiving a database of changes, each change corresponding to a dimension of one or more dimensions;
generating a set of linked knowledge graphs for a particular domain, the set of linked knowledge graphs representing an evolution from the initial knowledge graph in the one or more dimensions, each knowledge graph in the set of linked knowledge graphs being based on one or more changes provided in the database of changes and the initial knowledge graph, the set of linked knowledge graphs being generated by:
providing a link between a node of the initial knowledge graph and a node of a first knowledge graph of the set, and providing a link between the node of the first knowledge graph and a node of a corresponding second knowledge graph of the set, a value of the node of the first knowledge graph being different from a value of the node of the second knowledge graph, the first knowledge graph and the second knowledge graph representing respective versions of the initial knowledge graph, and links being absent between nodes of the initial knowledge graph and the first knowledge graph and nodes of the first knowledge graph and the second knowledge graph having values that are consistent between versions;
receiving query data from a data source;
generating a query knowledge graph based on the query data and one of the first knowledge graph and the second knowledge graph in the set of linked knowledge graphs, the query knowledge graph comprising a change with respect to the one of the first knowledge graph and the second knowledge graph in the set of linked knowledge graphs; and
determining that the query data is inconsistent with the query knowledge graph, and in response, issuing an alert.

26. The system of claim 25, wherein the query knowledge graph is generated based on the query data, and a final knowledge graph in the set of linked knowledge graphs.

27. The system of claim 25, wherein determining that the context data is inconsistent with the reconfigured knowledge graph at least partially comprises determining that the link is invalid.

28. The system of claim 25, wherein the context data changes in at least one dimension of the one or more dimensions.

29. The system of claim 25, wherein the one or more dimensions comprise time, geography, and regulations.

30. The system of claim 25, wherein generating a disambiguated domain ontology based on a domain ontology of the particular domain, and context data received from a data source comprises linking a term of the domain ontology with a respective value of the context data.

31. The system of claim 25, wherein generating a contextualized knowledge graph based on the disambiguated domain ontology, and a knowledge graph in the set of linked knowledge graphs comprises associating a term of the disambiguated domain ontology with a node of the knowledge graph, and the change comprising an added node to the contextualized knowledge graph from the knowledge graph.

32. The system of claim 25, wherein at least a portion of the context data is received from one or more sensors.

33. The system of claim 25, wherein the query knowledge graph is generated by inserting one or more nodes based on the query data into the knowledge graph in the set of linked knowledge graphs.

34. The system of claim 33, wherein operations further comprise linking the one or more inserted nodes to one or more nodes in the knowledge graph in the set of linked knowledge graphs.

35. The system of claim 25, wherein operations further comprise determining the node in the knowledge graph in the set of linked knowledge graphs to which the inserted node is to be linked based on context data received from a data source.

36. The system of claim 25, wherein the query data varies over the dimension.

* * * * *